United States Patent
Solow et al.

(10) Patent No.: US 12,401,514 B2
(45) Date of Patent: Aug. 26, 2025

(54) PREVENTING UNAUTHORIZED EXPOSURE OF SENSITIVE DATA

(71) Applicant: Bank of America Corporation, Charlotte, NC (US)

(72) Inventors: Aeric Solow, Richardson, TX (US); Manu Kurian, Dallas, TX (US); Ganesh Bonda, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 264 days.

(21) Appl. No.: 18/198,866

(22) Filed: May 18, 2023

(65) Prior Publication Data

US 2024/0388436 A1 Nov. 21, 2024

(51) Int. Cl.
*H04L 9/32* (2006.01)
*G06F 21/62* (2013.01)

(52) U.S. Cl.
CPC ........ *H04L 9/3221* (2013.01); *G06F 21/6245* (2013.01)

(58) Field of Classification Search
CPC .. H04L 9/3221; H04L 9/3218; G06F 21/6245
See application file for complete search history.

(56) References Cited

U.S. PATENT DOCUMENTS

| | | | |
|---|---|---|---|
| 11,329,825 B2 * | 5/2022 | Gallagher | H04L 9/3239 |
| 2024/0187264 A1 * | 6/2024 | Wu | H04L 9/3218 |

OTHER PUBLICATIONS

"Zero Knowledge Proof Identity Management," Identity Management Institute, https://identitymanagementinstitute.org/zero-knowledge-identity-proof/#:~:text=A%20zero-knowledge%20identity%20proof%20is%20a%20term%20used.further%20disclosing%20any%20additional%20sensitive%20or%20personal%20information, Retrieved on May 8, 2023.

Vincent Tabora, "The Use of Self-Sovereign Identity With Zero-Knowledge Proof (ZKP)," https://medium.datadriveninvestor.com/self-sovereign-identity-with-zero-knowledge-proof-9a05136f16da, Oct. 2, 2018.

"Zero Knowledge Proof," Wikimedia Foundation, Inc, https://en.wikipedia.org/wiki/Zero-knowledge_proof, Retrieved on May 4, 2023.

"What Are Zero Knowledge Proofs?" Ethereum, https://ethereum.org/en/zero-knowledge-proofs/, May 1, 2023.

* cited by examiner

*Primary Examiner* — Khoi V Le
(74) *Attorney, Agent, or Firm* — Weiss & Arons LLP

(57) ABSTRACT

A method for determining whether an existing customer is eligible for a zero-knowledge proof ("ZKP") application is provided. The method may include determining that the existing customer possesses a private key linked to an account profile associated with the existing customer absent provision of the private key. The determining may also include executing a behavior-scan on the account profile to confirm that a score of the behavior-scan is equal to or greater than a pre-determined score. In response to the determining that the existing customer is eligible for the ZKP application, the method may include generating the ZKP application by executing an encryption algorithm on the sensitive data of the account profile to output a digital zero-knowledge token for each of the sensitive data and auto-filling each input field in the ZKP application that is associated with sensitive data with the digital zero-knowledge token.

14 Claims, 4 Drawing Sheets

PREVENTING UNAUTHORIZED EXPOSURE OF SENSITIVE DATA

FIELD OF TECHNOLOGY

Aspects of the disclosure relate to preventing sensitive data exposure.

BACKGROUND OF THE DISCLOSURE

Personal and private data is used widely and frequently for authenticating a user into an entity network. The personal and private data is also used for completing applications, documents and forms for applying for services within an entity, i.e.—financial assistance, mortgage applications and any other suitable service.

Such data may be stored within databases associated with the entity. The data is typically stored within a secure database and may include extra layers of security protection to prevent the data from being accessed by hackers.

Applications for services may entail filling in numerous input fields with private data, sensitive data and non-sensitive data.

It would be desirable to authenticate a user for applying for services without exposure of sensitive data. It would be further desirable to generate one or more tokens for input within authentication applications in place of continuously sharing the private data.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
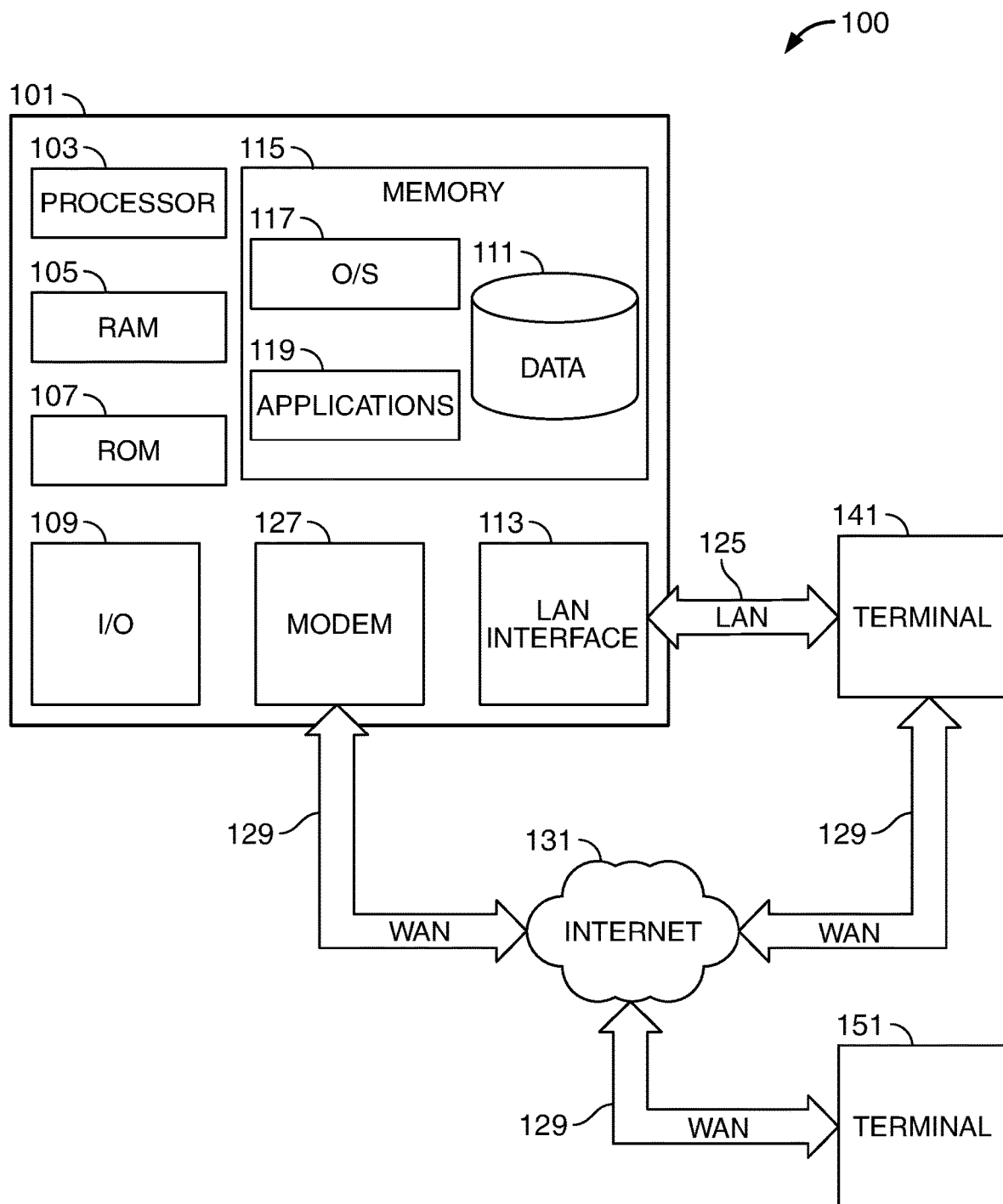
FIG. 1 shows an illustrative block diagram in accordance with principles of the disclosure.

A method for applying for a service within an entity network without releasing sensitive data is provided. The service may be a service provided by a sub-entity. The sub-entity may operate within an entity. The entity may be a large corporation. A user may have an account within one small corporation within the entity.

The method may include receiving, via a receiver at the entity network, a request for an application for the service from an existing customer of the entity. The existing customer may be a customer of one sub-entity within the entity. The existing customer may request service from a second sub-entity within the entity. The user may request service from another small corporation within the entity. The entity may require the user to provide personal data for each sub-entity within the entity. The request may be received from a computing device of the existing customer. The request may be received as an electronic communication between the computing device and the entity network.

When an individual becomes a user of an entity, the individual may set up a new account within the entity. When a new account is created, an account profile is set up for the user. The account profile may include the user's personal information. The account profile may include the user's financial information.

Personal information may include both sensitive data and non-sensitive data. Personal information may include the user's first name, last name, address, citizenship, date of birth, social security number, financial account number and any other suitable personal information.

Once the personal information is inputted into the account profile, the entity may verify and authenticate all the data. The entity network may verify each of the sensitive data inputted into the account profile for authenticity. Upon authentication of each of the sensitive data, the method may include generating the private key.

The entity network may generate a private key that may be unique to the user and may be linked to the user's account profile. The user's account profile data may be fed into a computational algorithm for generating the private key.

The private key may be shared with the user. The private key may be stored in a secure storage within the entity server.

The entity may include numerous sub-entities. Each sub-entity may provide a service that may be different from another sub-entity. When the user applies for a service at one of the sub-entities, the user may need to create a new account. In some embodiments, the user may not need to create a new account. However, the user may need to provide personal identification to authenticate the user as being associated with the existing account profile.

The system may leverage zero-proof knowledge ("ZKP") for authenticating the user as being the existing customer. The system may use interactive proof to verify that the user possesses the private key without the user actually providing the private key.

Once the system verifies that the user possesses the private key, the system may be enabled to generate a ZKP application for applying for the service within the sub-entity.

The ZKP application may be an application where the system may automatically auto-fill the input fields that are associated with sensitive information with a digital ZKP token. The digital ZKP token may represent the sensitive data stored in the user's account profile within the entity.

In some embodiments, the existing customer may require manually filling out the complete application for the service including the sensitive data. In some embodiments, the existing customer may be eligible for applying for the service using a ZKP application.

The method may include determining, via a processor of the entity network, whether the existing customer is eligible or is not eligible for the ZKP application.

The determining may include executing via the processor, a ZKP verifier application for verifying that the existing customer has an account profile stored in a database on a central server associated with the entity. The verifying may further include verifying that all sensitive data included in the account profile has been previously authenticated by the entity.

The verifying may further include, verifying that the account profile has a private key linked to the account. The verifying may include verifying that the existing customer possesses the same private key absent providing the private key itself.

The verifying of the private key may be enabled using ZKP protocol. The verifying may include using interactive proof of ZKP for verifying the private key.

The ZKP protocol may be any ZKP known to those skilled in the art. For example, the ZKP discussed herein may be an interactive ZKP or a non-interactive ZKP.

The interactive proof of ZKP may be between the central server and the existing customer. The interactive proof may be between the central server and a computing device of the existing customer.

The interactive proof may include generating, via the central server, a challenge. The challenge may be a random value.

The interactive proof may further include, following the generating, creating, via the existing customer, a response to the challenge using the private key. The response may use the key absent provision of the private key. The private key may be used but may not be actually provided.

The interactive proof may further include authenticating, via the central server, the response to the challenge. In response to the authenticating, the interactive proof may include verifying the private key.

When the private key is not verified, the existing customer may not be eligible for access to use of the ZKP application.

Following the verifying of the private key, the method may include executing an account scanner application for scanning an account profile of the existing customer. The scanning may perform a behavior scan for scanning the account profile and additional accounts that may be associated with the existing customer. The scanning may determine a behavior score for one or more account behaviors.

The account scanner application may crawl to determine whether any potential fraud activity is identified as being associated with an account of the existing customer. The scanning application may verify that there is no overdue payment pending that is associated with the account. The scanning application may further confirm that the account is an active account.

The method may include confirming that a total score of the scanning may be at least equal to or greater than a pre-determined score in order to be eligible for access to the ZKP application for applying for the service.

When the behavior-scan returns a score that is less than the pre-determined score, the method may include generating a manual-fill application for the existing customer.

When the score is less than the pre-determined score it may be an indication that activity associated with the account profile may include questionable activity. The questionable activity may include one of a fraud attempt, overdue payment and an inactive account, or any other suitable activity.

The pre-determined score may be a high percentage score, such as any integer above 80%. This may restrict the usage of the ZKP application to customers who possess the private key and have an active account that meets the account behavior criterion. In exemplary embodiments, the pre-determined score may be set to 80%. The pre-determined score may be set to 90%.

The pre-determined score may alternately be any suitable score, such as 20%, 30%, 40%, 50%, 60%, 70% or 80%.

In response to the determining that the existing customer is eligible for the ZKP application, the method may include generating via the processor the ZKP application.

The generating may include executing an encryption application for running an encryption algorithm on the sensitive data within the account profile of the existing customer to output a digital zero-knowledge token for each of the sensitive data within the profile.

The encryption algorithm may encrypt the sensitive data together with the private key to generate the digital zero-knowledge token. The digital zero-knowledge token may be stored in the account profile.

It should be appreciated that the sensitive data may not be extracted from the digital zero-knowledge token. The digital zero-knowledge token may replace the input of sensitive data. When the processor within the sub-entity processes the application for the service, the processor may confirm with the central server, the legitimacy of the digital zero-knowledge token. Upon confirming that the digital zero-knowledge token is legitimate, the processor may process the application.

In some embodiments, the digital zero-knowledge token may be a single token used for all sensitive data associated with the account profile.

In some embodiments, the digital zero-knowledge token may be a unique token for each piece of sensitive data stored in the account profile.

The sensitive data may include any one or more of a name, date of birth, social security number, age and citizenship and/or any other sensitive data that may be included in a user's account profile.

The generating may also include, following the executing of the encryption algorithm, auto-filling via the processor each input field in the ZKP application that is associated with sensitive data, with the digital zero-knowledge token.

Following the generating, the method may include manual-filling each input field that is not associated with sensitive data.

The method may further include transmitting the ZKP application including the inputted data from the computing device to the central server for authentication.

The authenticating may include confirming via the central server that the zero-knowledge token embedded within the ZKP application input fields is identical to the zero-knowledge token stored in the account profile of the existing customer applying for the service.

Following confirming, the method may include processing the application for the service within the sub-entity.

When the existing customer is not eligible for the ZKP application, the method may include generating via the processor a manual-fill application.

The method may further include displaying the manual-fill application on the UI of the computing device. The method may further include receiving input of data within each input field on the manual-fill application. The manual-fill application may be displayed on the UI within a mobile application associated with the sub-entity running on the computing device.

The manual-fill application may entail manually-filling each input field including the input fields associated with sensitive data. The method may further include transmitting the manual-fill application from the computing device to the central server.

The entity may store the account profile without sharing sensitive data stored within the account profile to any sub-entity within the entity.

It should be appreciated that in some embodiments the private key may be generated when the account profile is initially created.

The entity network may use the private key in combination with running an encryption algorithm on the sensitive data to generate the digital ZKP token.

A digital ZKP token may be generated for each piece of sensitive data. For example, each input field that includes sensitive data may be auto-filled with a unique value. The unique value may be a digital ZKP token generated based on the corresponding sensitive data stored in the account profile.

In some embodiments, there may be one digital ZKP token used for all auto-filled input fields.

In some embodiments, the ZKP token may be a hash-value hashed from the sensitive data.

The digital ZKP token may be stored in the account profile to enable authentication of the application for the service.

When a user is eligible for the ZKP application, upon submission of the application for the service to the sub-entity, the ZKP application may be fed through the entity processor. The entity processor may verify that the digital ZKP token is identical to the digital ZKP token stored in the account profile of the existing customer.

It should be appreciated that the ZKP application may only be operable once the private key has been verified by the central server.

A method for authenticating an existing customer for eligibility for zero-knowledge proof service within an entity network is provided.

The method may include verifying, via a processor of the entity network, that the existing customer is associated with an account profile stored on a central server associated with an entity. The verifying may leverage ZKP. The verifying may include, using ZKP, to verify that the existing customer possesses a private key associated with the account profile without actually providing the private key.

The verifying may include generating, via the central server, a challenge. The challenge may be a random value. The method may further include creating, via the computing device of the existing customer, a response to the challenge using the private key, but without disclosing the private key. The method may further include authenticating, via the central server, the response to the challenge. In response to the authentication, the method may include verifying the private key.

Following verifying the private key, the method may include executing an account scanner application. The account scanner application may scan the account profile for scoring behaviors associated with the account profile. The account scanner application may confirm whether the behavior-scan score is equal to or greater than a pre-determined score.

When the behavior-scan score is less than the pre-determined score, the method may include generating a manual-fill application, where the manual-fill application may entail the user manually inserting data associated with each input field including sensitive and private data.

In response to the verifying of the private key and in response to the confirming that the behavior-scan is equal to or greater than the pre-determined score, the method may include generating a ZKP application for a service for use by the existing customer.

The running of the behavior-scan may include executing a scanning application for crawling the account profile to determine whether any potential fraud activity is identified as being associated with an account of the existing customer. The scanning application may further crawl the account profile for verifying that there is no overdue payment pending that is associated with the account. The scanning application may further crawl the account profile for confirming that the account is an active account.

The method may further include, following the verifying of the private key, further verifying the existing customer as being associated with the account profile by requesting input of a biometric. The method may include comparing the inputted biometric to one or more biometrics stored within the account profile. The method may further include following verifying that the inputted biometric matches one of the stored biometrics, verifying the existing customer.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein, such as the entity network, the central server, the receiver, the processor, the database, the ZKP verifier application, the account scanner application, the encryption application and the computing device(s) of the existing customer. The Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
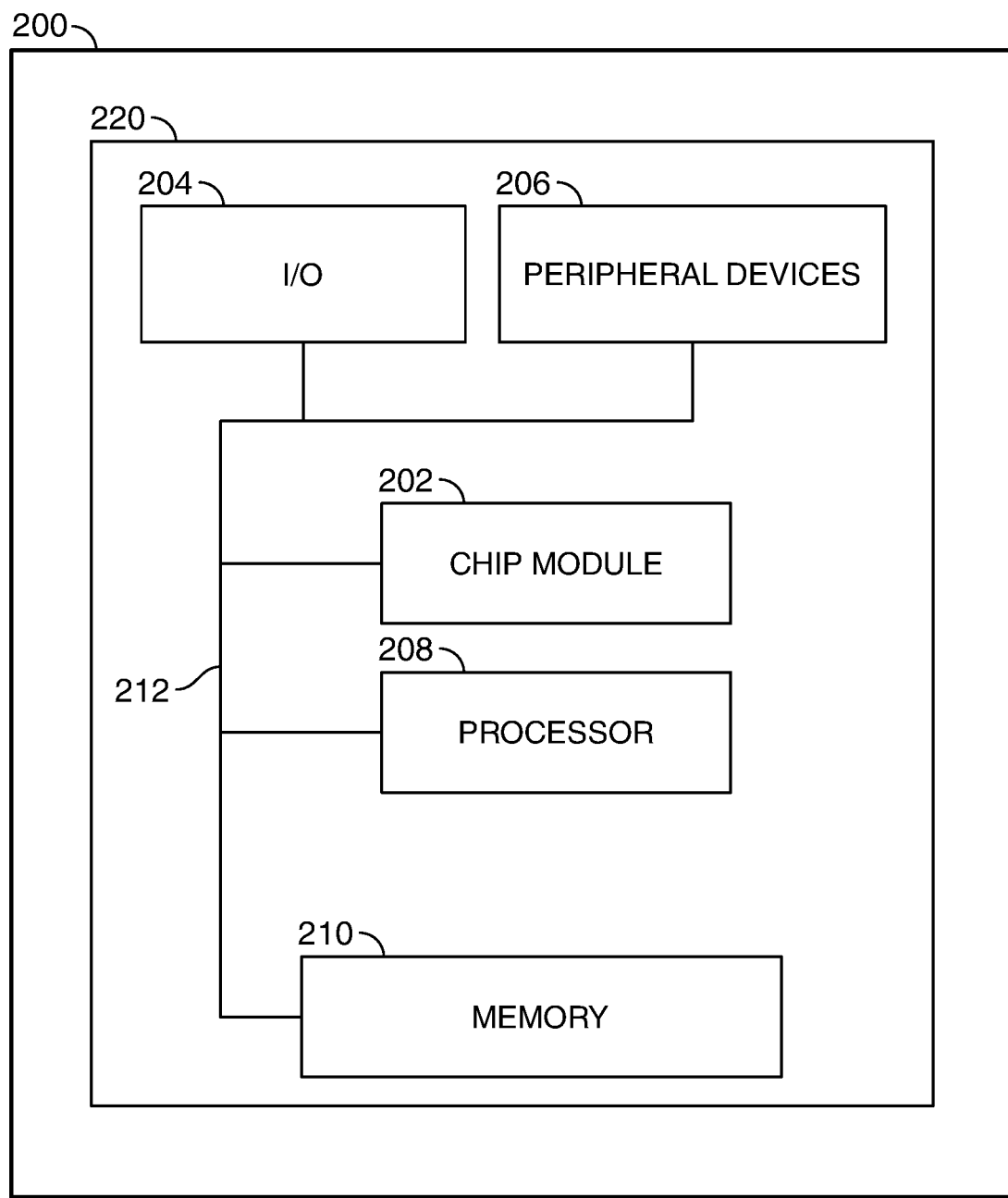
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
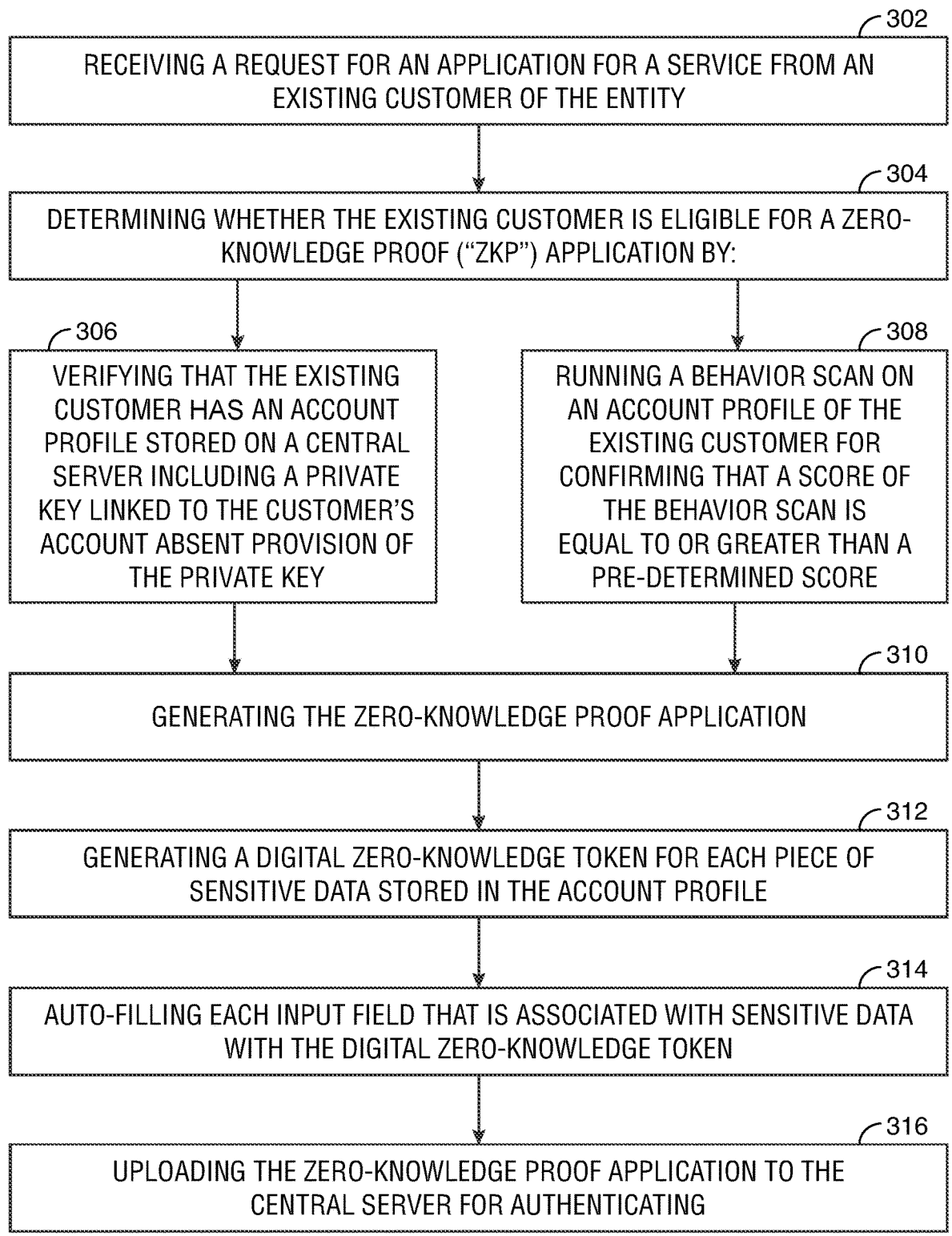
FIG. 3 shows an illustrative flow chart in accordance with principles of the disclosure.

FIG. 3 shows an illustrative flow chart in accordance with principles of the disclosure. The illustrative flow chart shows the steps of authenticating a user requesting a service as an existing customer of the entity and further generating a ZKP application following verification.

At step 302, the step may include receiving at the central server a request for an application for a service from an existing customer of the entity.

At step 302, the step may include determining whether the existing customer is eligible for a ZKP application. The determining for eligibility may include, as shown at 306, verifying that the existing customer has an account profile stored on the central server. The determining may further include verifying that the account profile has a private key linked to the account profile.

Following the verifying of the private key, the determining of eligibility may include, as shown at 308, running a behavior scan on the account profile. The behavior scan may output a score. Step 308 may confirm whether the score is equal to or greater than a pre-determined score.

Following verifying both the private key and that the behavior scan has a score equal to or greater than the pre-determined score, step 310 may be performed. At 310, the step may include generating the ZKP application.

The generating of the ZKP application may include generating a digital zero-knowledge token for each piece of sensitive data stored in the account profile, as shown at 312. The generating of the ZKP application may also include auto-filling each input field that is associated with sensitive data, with the digital zero-knowledge token, as shown at 314.

In some embodiments, following the auto-filling, the method may include manually-filling input fields that may not be associated with sensitive data. Upon completing the manually-filling, transmitting the ZKP application to the central server for authenticating, as shown at 316.

Figure 4:
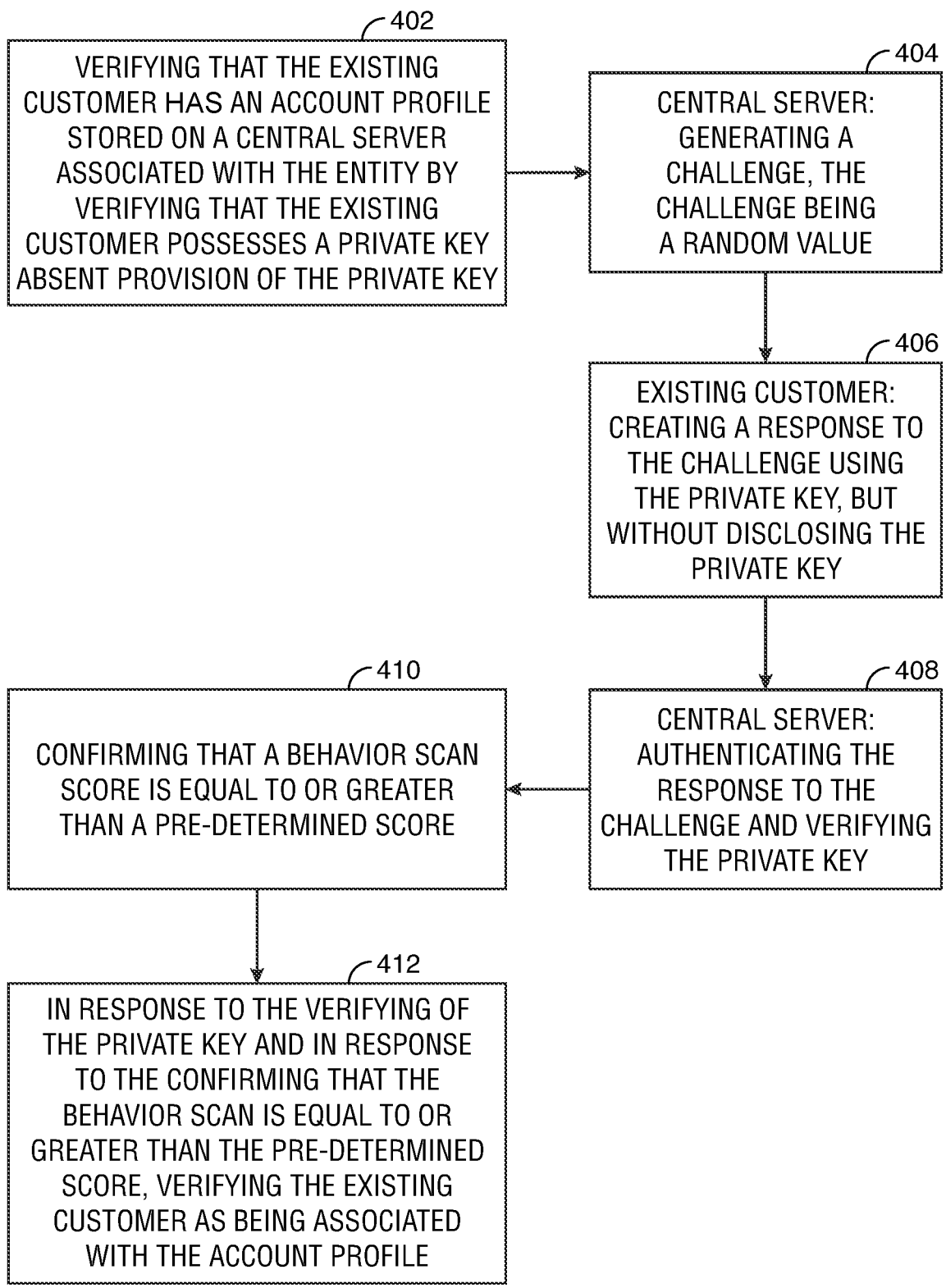
FIG. 4 shows an illustrative flow chart in accordance with principles of the disclosure.

FIG. 4 shows an illustrative flow chart in accordance with principles of the disclosure. The illustrative flow chart may display the steps for verifying eligibility of an existing customer for a ZKP application when applying for a service.

Step 402 may include verifying that the existing customer has an account profile stored on the central server. The account profile may be associated with the entity. The verifying may include verifying that the existing customer possesses a private key. The existing customer may verify possession of the private key absent provision of the private key.

Steps 404, 406 and 408 may leverage ZKP protocol for verifying the private key absent provision of the private key.

At step 404, the central server may generate a challenge. The challenge may be a random value.

At step 406, the existing customer, via a computing device, may create a response to the challenge using the private key. The private key may not actually be disclosed. The existing customer may be enabled to show that the customer possesses the private key without sharing the private key.

At step 408, the central server may authenticate the response to the challenge and verify the private key.

At step 410, following the verifying of the private key, confirm that a behavior scan score is equal to or greater than a pre-determined score.

At step 412, in response to the verifying of the private key and in response to the confirming that the behavior scan is equal to or greater than the pre-determined score, verifying the existing customer as being associated with the account profile.

Thus, systems and methods for preventing unauthorized exposure of sensitive data is provided. Persons skilled in the art will appreciate that the present invention can be practiced by other than the described embodiments, which are presented for purposes of illustration rather than of limitation.

What is claimed is:

1. A method for applying for a service provided by an entity network without exposing sensitive data, the service being associated with a sub-entity within an entity, the method comprising:
   receiving from a computing device of an existing customer of the entity, via a receiver at the entity network, an electronic communication comprising a request for an application for the service;
   determining, via a processor of the entity network, whether the existing customer is eligible for a zero-knowledge proof ("ZKP") application, the ZKP application comprising sensitive data input fields, the processor operable to auto-fill the sensitive data input fields with a digital ZKP token, the determining comprising executing by the processor:
      a ZKP verifier application for verifying that the existing customer comprises an account profile stored in a database on a central server of the entity network by verifying, using ZKP, that the existing customer comprises a private key linked to the account profile, the verifying absent provision of the private key; and
      an account scanner application for scanning an account profile of the existing customer to confirm that a score of a behavior-scan is equal to or greater than a pre-determined score;
   in response to the determining that the existing customer is eligible for the ZKP application:
      generating, via the processor, the ZKP application;
      encrypting each piece of sensitive data together with the private key using an encryption algorithm; to generate a digital ZKP token for each piece of sensitive data; and
      auto-filling, via the processor, each input field that is associated with sensitive data, with the digital ZKP token;

displaying the ZKP application on a user interface ("UI") of the computing device of the existing customer;

receiving input of data within each input field that is not associated with sensitive data on the UI;

storing the data; and transmitting the ZKP application including the inputted data from the computing device to the central server for authenticating; and in response to the determining, via the processor, that the existing customer is not eligible for the ZKP application:

generating, via the processor, a manual-fill application;

displaying the manual-fill application on the UI of the computing device;

receiving input of data within each input field on the manual-fill application; and transmitting the manual-fill application from the computing device to the central server.

2. The method of claim 1 wherein the existing customer is not eligible for the ZKP application when the behavior-scan returns a score that is less than the pre-determined score.

3. The method of claim 2 wherein the score is less than the pre-determined score when account activity comprises questionable activity.

4. The method of claim 3 wherein the questionable activity is one of a fraud attempt, overdue payment and an inactive account.

5. The method of claim 1 wherein the verifying the private key comprises using interactive proof of ZKP for verifying the private key, the interactive proof being between the central server and the computing device of the existing customer, the interactive proof comprising:

generating, via the central server, a challenge, the challenge being a random value;

creating, via the computing device of the existing customer, a response to the challenge using the private key, absent provision of the private key;

authenticating, via the central server, the response to the challenge; and in response to the authenticating, verifying the private key.

6. The method of claim 5 wherein the digital zero-knowledge token is generated following the verifying of the private key.

7. The method of claim 6 wherein the digital zero-knowledge token is stored in the account profile.

8. The method of claim 7 wherein following the transmitting of the ZKP application to the central server for authenticating, the method comprises confirming that the zero-knowledge token is identical to the zero-knowledge token stored in the account profile.

9. The method of claim 8 wherein in response to the confirming, the method comprises processing the application for the service.

10. The method of claim 1 wherein the sensitive data comprises any one or more of a name, date of birth, social security number, age and citizenship.

11. The method of claim 1 wherein the entity network securely stores the account profile including the sensitive data within the database.

12. The method of claim 6 further comprising generating a unique digital zero-knowledge token for each piece of sensitive data stored in the account profile and auto-filling each input field on the application with the unique digital zero-knowledge token that corresponds to the input field.

13. The method of claim 1 wherein the private key is generated when the account profile is initially created.

14. The method of claim 1 wherein the ZKP application is an application for the service associated with the sub-entity that is generated for each existing customer that is eligible, wherein the ZKP application does not require exposure of sensitive data.

* * * * *